Patented Jan. 19, 1932

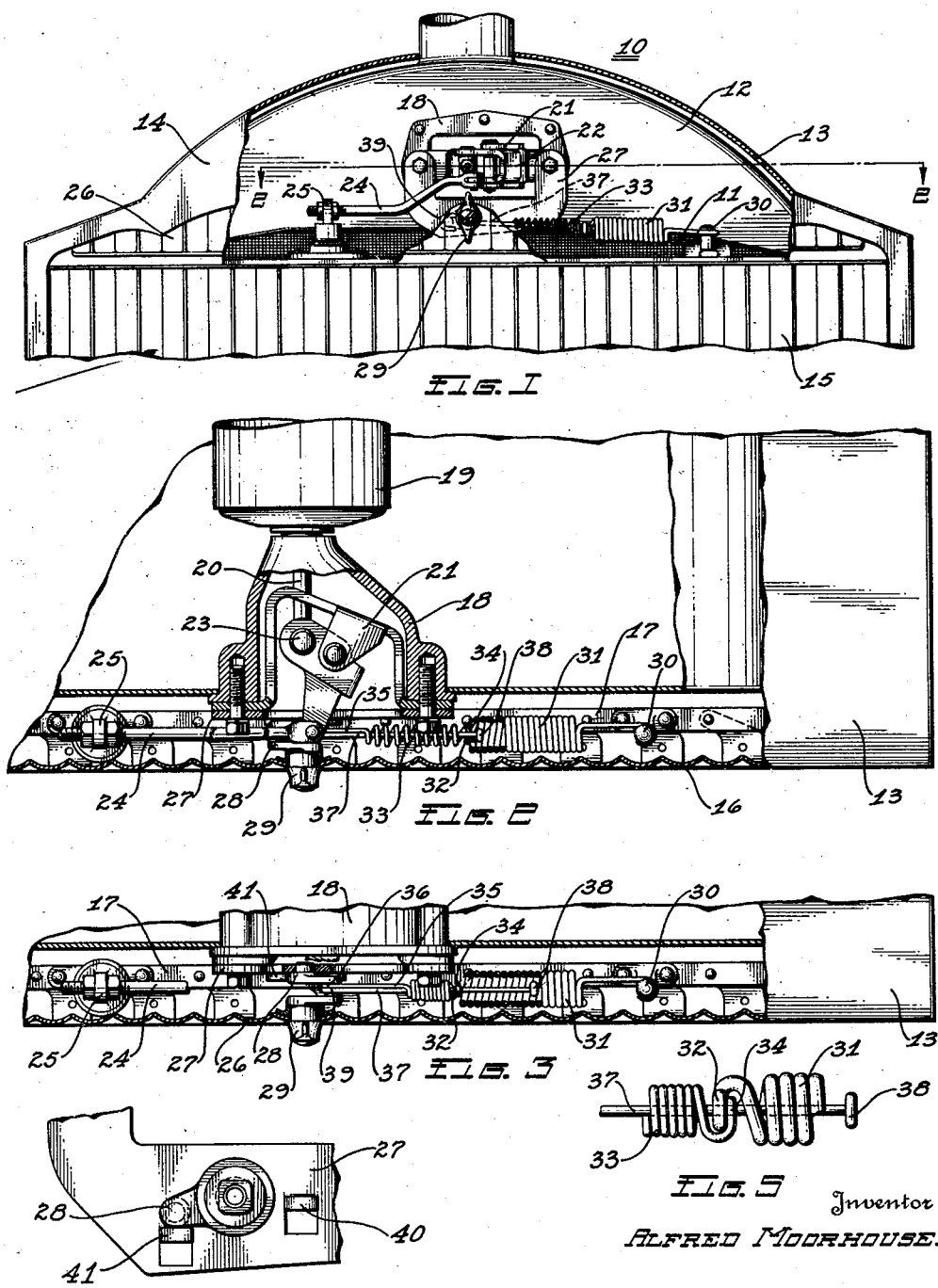

1,841,416

UNITED STATES PATENT OFFICE

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN

INTERNAL COMBUSTION ENGINE

Application filed March 30, 1929. Serial No. 351,231.

This invention relates to internal combustion engines and more particularly to means for controlling shutters for the radiators thereof.

It has heretofore been proposed to provide a motor vehicle radiator with shutters for controlling the passage of air therethrough and a thermostat operatively connected to the shutters and associated with the radiator, so that it will be subjected to the cooling medium flowing through the cooling system.

It has also been proposed to provide means whereby the thermostat may be easily removed for purposes of replacement, repair or the adjustment required due to atmospheric temperature variations.

Generally, in prior structures of this type ready adjustment of the thermastat has proved a problem of considerable magnitude since it has been found necessary to dismantle the thermostat to effect adjustment thereof. It is the aim of the present invention to overcome these objections.

An object of the invention is to provide a control for a thermostatically operated shutter.

Another object of the invention is to provide a means which may be easily and quickly manipulated to control the action of a thermostat operatively connected to the shutter of a motor vehicle radiator.

Another object of the invention is to provide a control means for a thermostatically operated shutter for a motor vehicle radiator in which the control element is readily accessible.

A further object of the invention is to provide a thermostatically operated shutter for a motor vehicle radiator in which the thermostat is positioned within the radiator and the control element is on the exterior thereof, the control being of such a character that it may be adjusted to oppose the movement of the thermostat according to the variations in atmospheric temperature.

Still a further object of the invention is to provide a control for a thermostatically operated shutter for a motor vehicle radiator having a theremostat associated with the radiator and operatively connected to the shutter and a control for the thermostat arranged so that but few parts are required for the production of a device in which the action will be positive, highly efficient in operation and of marked simplilcity as a whole and in respect to each of its component parts, so that its manufacture may be economically facilitated both as regards parts and their assembly.

Other objects of the invention will appear from the following description taken in connection with the drawings, which form a part of this specification, and in which:

Fig. 1 is a front elevation of a radiator and a shell therefor partly broken away illustrating the invention as applied;

Fig. 2 is a sectional view taken on line 2—2 of Fig. 1, illustrating the control in one position;

Fig. 3 is a fragmentary view partly in section illustrating the control in another position;

Fig. 4 is a fragmentary view illustrating the adjustment means for the control, and Fig. 5 is a detail view ilustrating the connection between the coil springs.

Referring to the drawings for more specific details of the invention, 10 represents generally a radiator for an internal combustion engine. The radiator is of the conventional type having a core 11 and an upper tank 12 positioned in a shell 13. As shown, the shell is provided with an ornamental front 14 of any preferred design and mounted on the front of the radiator is a shutter 15 which may be of any suitable structure having louvers 16 operatively connected to a slide 17.

Secured in the front face of the tank 12 is a cup member 18 supporting within the tank a thermostat 19, the movable member of which (not shown) is connected to a rod 20 suitably mounted for reciprocation in the wall of the cup 18. Positioned in the cup is a bracket 21 and pivotally secured thereto is a bell crank lever 22, one arm of which is connected to the rod 20 as indicated at 23 and the other arm is connected to a rod 24 adjustably secured to a stud 25 on the slide 17.

From the foregoing it will be observed that the shutter 15 will be efficiently operated by the thermostat 19 through the rod 20, the bell crank lever 22 and the rod 24 according to the temperature of the cooling medium flowing through the cooling system. Structures of a similar character are known in the art.

Positioned on the face of the tank 12 within the shell 13 above the shutter 15 is a panel 26. As shown, the panel 26 is designed to present the same appearance as the shutter 15 when the shutter is in a closed position. Bolted or otherwise secured to the front of the tank is a bracket 27 and pivotally mounted in the bracket and the panel 26 is a crank shaft 28 having on one end thereof a thumb nut 29 positioned in front of the panel 26 substantially centrally between the ends thereof.

Positioned on the slide 17 is a stud 30 to which is suitably attached a coil spring 31. As shown, one end of this spring is attached to the stud 30 and the other end thereof is provided with an eye 32. A coil spring 33 of less tensile strength than the spring 31 is connected to the spring 31. As shown, the spring 33 has an eye 34 adapted to register with the eye 32 on the spring 31 and the eye 34 is positioned back of the eye 32, and the other end of the spring 33 terminates in a rod 35 having a hook 36 on its free end adapted to engage the crank on the shaft 28.

A rod 37 passes through the spring 33 and the registering eyes 32 and 34. This rod is provided on one end with a knob or button 38 and on the other end with a hook 39 engaging the crank on the shaft 28. The rod 37 retains the eyes 32 and 34 in engagement and is adapted to reciprocate freely therein. In the position shown in Figs. 1 and 2 the rod 37 is taut with the button 38 thereon in engagement with the eye 34. When in this position any movement of the thermostatic element tending to open the shutter 15 is opposed by the coil spring 31. Resistance to the opening movement of the shutter is through the rod 37 and the coil spring 31 to the slide 17. The tensile strength of the spring 31 is greater than the tensile strength of the spring 33 hence the greater resistance to the opening movement of the shutter is imposed when adjusted as above described, such adjustment being suitable for cold or winter weather.

In the position shown in Fig. 3 the thumb nut 29 has been turned to move the shaft 28 through a radius of 180° to engage a stop 40 on the bracket 27. In assuming this position tension is removed from the rod 37 and the rod is reciprocated through the eyes 32 and 34 to position the knob end of the rod between the convolutions of the coil spring 31. When so adjusted any movement of the thermostatic element tending to open the shutter 15 is resisted by the coil spring 33 which has less tensile strength than the spring 31. Accordingly, movement of the thermostatic element will be quicker. Hence, this adjustment is suitable for warm or summer weather.

When it is desired to adjust the device for operation in cold weather the thumb nut 29 is turned to move the crank shaft 28 through an arc of 180° to engage a stop 41. When in this position the crank to which the rods 35 and 37 are attached is off center and hence the load placed thereon by the coil spring 31 through the rod 37 will tend to securely retain the shaft in position. By turning the thumb nut through an arc of 180° in either direction the device can be easily and quickly adjusted to control the operation of the thermostat to meet the requirements according to atmospheric temperature variations.

Although this invention has been described in connection with certain specific embodiments, the principles involved are susceptible of numerous other applications which will readily occur to persons skilled in the art. The invention is, therefore, to be limited only as indicated by the scope of the appended claims.

Having thus described the various features of my invention, what I claim as new and desire to secure by Letters Patent is:

1. In combination with a radiator, a shutter therefor and a thermostat operatively connected to the shutter, a plurality of spring members connected to the shutter, each having different tensile strength and a single means for alternately varying the operative relation of the members to the shutter.

2. In combination with a radiator, a shutter therefor and a thermostat operatively connected to the shutter, resilient tension members of different tensile strength connected to the shutter to resist the opening movement and to amplify the closing movement of the shutter and a single means for placing one member in operative relation to the shutter simultaneously upon placing another member out of operative relation thereto.

3. In a cooling system for an internal combustion engine having a radiator, a shutter for the radiator and a thermostat operatively connected to the shutter, a control means, spring members connected in series between the shutter and the control means and means operated by the control for varying the tension on one member and simultaneously varying the operative relation of the other member to the shutter.

4. In a cooling system for an internal combustion engine having a radiator, a shutter for the radiator and a thermostat operatively connected to the shutter, a control, resilient members of different tensile strength connected in series between the shutter and the control and means operable by the control to alternately vary the operative relation of members to the shutter.

5. In a cooling system for an internal combustion engine having a radiator, a shutter for the radiator and a thermostat operatively connected to the shutter, a control member, resilient tension members connected in series between the shutter and the control member, means operable by the control member for varying the tension, and means for retaining the control member in a plurality of positions.

6. In a cooling system for an internal combustion engine having a radiator, a shutter for the radiator and a thermostat operatively connected to the shutter, a control member, means for retaining the control member in a plurality of positions, a plurality of coil springs connected in series between the shutter and the control member and a rod operated by the control member to vary the tension on the springs.

7. In a cooling system for an internal combustion engine having a radiator, a shutter for the radiator and a thermostat operatively connected to the shutter, a control device, springs of different tensile strengths connected together in series between the control device and the shutter to close said shutter, and means to positively limit the weaker spring to a predetermined extension.

8. In a cooling system for an internal combustion engine having a radiator, a shutter for the radiator, and a thermostat operatively connected to the shutter, a shutter closing device including springs of different tensile strength connected together and contractable to close the shutters, and a control device adapted to selectively limit the spring extension to either spring.

9. In a cooling system for an internal combustion engine having a radiator, a shutter therefor, and thermostatic means to operate said shutter, a device to oppose opening action of the thermostatic means on the shutter including springs of different tensile strengths connected end to end, and inextensible means to transfer the spring pull through the weaker to the stronger spring upon a predetermined extension of the weaker spring.

In testimony whereof I affix my signature.

ALFRED MOORHOUSE.